Patented Jan. 31, 1939

2,145,662

UNITED STATES PATENT OFFICE 2,145,662

METHOD OF CONTROLLABLY RETARDING THE CRYSTALLIZATION OF DEXTROSE

Carl S. Miner, Glencoe, and Alva Thompson, Chicago, Ill., assignors, by mesne assignments, to Corn Products Refining Company, New York, N. Y., a corporation of New Jersey No Drawing. Application June 17, 1935, Serial No. 27,065

10 Claims. (Cl. 99—134)

This invention relates to the crystallization of dextrose in the making of products, more particularly food products; and the primary object of the invention is to increase the range of usefulness and the value of anhydrous dextrose in the manufacture of food products by providing a method whereby the hydration of the anhydrous sugar, that is the transformation of the solid phase anhydrous into solid phase hydrate without the complete solution of the anhydride before crystallization begins, which process of hydration ordinarily takes place very rapidly in the presence of water, may be retarded to a very considerable extent, and to an extent which, by the use of properly selected agents may be controlled with a reasonable degree of accuracy.

The invention may be applied—to give a single, simple application of the invention, one use of many—to the making of icings for cakes. It has been customary in making cake icings to put together sugar, water, flavoring and other ingredients and boil the mixture until the water content has been reduced to the extent required for crystallizing the sugar. The mixture is then beaten until a fondant is formed composed of sugar crystals and syrup in such proportions as to give the material the right consistency for spreading on the cake. The spreading of the icing on the cake, however, does not stop the process of crystallization which continues so that the icing soon becomes hard and brittle, which is undesirable. This would be true whether one used sucrose, dextrose or other sugar in the composition.

According to the present invention the primary sugar ingredient is anhydrous dextrose (alpha anhydrous which is the commercial form of anhydrous dextrose), to which an edible retarding agent for prolonging the crystallizing period is added in making the icing, together with a small amount of hydrate dextrose to initiate the hydration of the anhydrous dextrose, which takes place on addition of water to the mixture. Several advantages result from this procedure: It is possible to make the icing without cooking. That is, the primary sugar, anhydrous dextrose, the retarding agent or agents, the nucleating substance dextrose hydrate, the flavoring substances and the other ingredients of the icing, may be mixed together dry and the dry mixture sold as such. Or the compound may consist merely of the primary sugar, the nucleating sugar and the retarding agent, leaving the user to mix with the compound the proper flavoring substances and other ingredients such as shortening, necessary or desirable for giving the icing the desired physical qualities. In either case, the user adds a specified amount of water to the compound and by mere mixing, at room temperature, produces the icing in condition to be spread upon the cake. Another advantage, which has already been suggested, is that by the use of the retarding agent or agents the period of crystallization subsequent to obtaining a consistency suitable for spreading on the cake may be very considerably prolonged. That is, the final setting of the compound to a hard mass, or put it another way, the complete hydration of the dextrose, can be considerably delayed and delayed to an extent that can be determined in advance with a fair degree of accuracy. While anhydrous dextrose will ordinarily set, or become hydrated, in the presence of the requisite amount of water in a few seconds, by the use of the retarding agents to be hereinafter specified, the crystallized icing composition can be made to remain soft for several days. Thus, it is not necessary to use the icing material immediately after it has been brought to the proper spreading consistency; and, what is more important, the icing can be made to remain soft for as long as the cake remains fresh enough to be palatable.

The retarding agents comprise all the common sugars, except alpha dextrose, such, for example, as sucrose, levulose, maltose, lactose, and even beta dextrose, which latter is to be found in the ordinary dextrose solution equilibrated as between the alpha and beta forms. These sugars, however, differ very much in the degree of retardation which they produce; and a combination of sugars has a retarding effect, the extent of which can not be predicated from a knowledge of the retarding effects of the sugars separately.

The retarding agents also include water dispersible colloids, as a class which, however, so far as our experiments have gone, have very little effect when used by themselves, but which, if combined with sugars, have a very marked retarding effect on the hydration of the anhydrous dextrose. For example, one of the greatest retarding effects which we have obtained has been by a mixture of casein and lactose in the proportions in which these substances are found in the ordinary skimmed milk solids.

It is apprehended that where a solid anhydrous dextrose is hydrated without being at any one time completely dissolved in water before the hydrate crystallization takes place, there is nevertheless a solution of the anhydrous, progressively, and a re-crystallization in the hydrate form. The reaction may be regarded as being substantially as follows: crystallized anhydrous alpha dextrose→dissolved anhydrous alpha dextrose plus water→dissolved alpha dextrose hydrate→crystallized alpha dextrose hydrate. When any one of the retarding substances, for example, beta dextrose, is present during the hydrating operation the rate of this reaction is slowed down. Whatever may be the explanation of this phenomenon, the retarding effect of the agents specified has been amply demonstrated empirically.

The hydration of the anhydrous dextrose, in order that it should start at all, at least within a reasonable time, or within a time that can be calculated with any degree of accuracy, requires the presence of solid phase hydrate dextrose as a nucleating agent, that is, to provide nuclei on which the dissolved dextrose can re-crystallize as hydrate. To some extent all commercial anhydrous dextrose already contains some hydrated dextrose. That is, all commercial anhydrous dextrose is, to some slight extent at least, hydrated, due probably to atmospheric moisture or possibly to a secondary hydrate crystallization when the purged massecuite is washed in the centrifugal machine. However, for practical control purposes, there should be added to the anhydrous dextrose a small quantity of hydrate dextrose crystals, preferably finely divided in order to get the maximum nucleating effect.

In order to determine the retarding effect of the substances specified herein as retarders, singly and for some possible combinations, water solutions of the retarders at various percentages (in weight of dry substance in the solution) were made up, and, in each case, an amount of anhydrous dextrose was added equal to four times the weight of the free water in the solution. These mixtures were allowed to set to a stage arbitrarily designated as "initial set". The "initial set" is defined as the point at which an aluminum ball three-eighths of an inch in diameter dropped into the mix from a height of one-half inch makes an impression seven thirty-seconds of an inch in diameter. The experiments were carried out at a temperature of 77° Fahrenheit. The nucleating agent consisted of 1% of hydrated dextrose reduced to pass through a screen of 40 meshes per linear inch and be retained on a 60 mesh screen.

The tables given below record the initial setting times for solutions of the retarding agents of the percentages given. As a basis for comparison, it may be said that where water was used, without any retarding agent, the initial set was practically instantaneous. In these tables the word "dextrose" always means an equilibrated solution.

TABLE A

Single sugars

| Retarding agents | Initial setting time |
|---|---|
| Sucrose, 40% | 9 minutes. |
| Sucrose, 30% | 3½ minutes. |
| Sucrose, 20% | 2½ minutes. |
| Lactose, 40% | 7 to 8 hours. |
| Lactose, 30% | 2 to 3 hours. |
| Lactose, 20% | 6½ minutes. |
| Dextrose, 60% | 2 hours. |
| Dextrose, 50% | 24 minutes. |
| Dextrose, 40% | 9 minutes. |
| Dextrose, 30% | 2½ minutes. |
| Dextrose, 20% | ½ minute. |
| Levulose, 40% | 4½ minutes. |
| Maltose, 60% | Over 10 days. |
| Maltose, 40% | 9 hours. |
| Maltose, 30% | 11 minutes. |
| Maltose, 20% | 2½ minutes. |

TABLE B

Combined sugars

| Retarding agents | Initial setting time |
|---|---|
| Sucrose, 20% / Dextrose, 20% | 8 minutes. |
| Sucrose, 30% / Dextrose, 10% | 9 minutes. |
| Dextrose, 30% / Sucrose, 10% | 8½ minutes. |
| Sucrose, 20% / Lactose, 20% | 30 to 40 hours. |
| Lactose, 20% / Sucrose, 10% | About 15 hours. |
| Lactose, 20% / Dextrose, 20% | 3 to 4 hours. |

TABLE C

Combined colloids and sugars

| Retarding agents | Initial setting time |
|---|---|
| Skimmed milk powder, 40% | 18 hours. |
| Lactose, 20% / Casein, 10% | 6 to 8 hours. |
| Lactose, 20% / Na caseinate, 10% | 2 hours. |
| Lactose, 20% / Dextrine, 10% | 22 minutes. |
| Lactose, 20% / Gelatin, 5% | 16 minutes. |
| Lactose, 20% / Low test glue, 10% | 11 minutes. |
| Lactose, 20% / Gum arabic, 10% | 9 to 12 minutes. |
| Lactose, 20% / Pectin, 10% | 20 minutes. |
| Sucrose, 20% / Casein, 10% | 80 minutes. |
| Sucrose, 20% / Dextrine, 10% | 3½ minutes. |
| Sucrose, 20% / Gelatin, 5% | 4 minutes. |
| Sucrose, 20% / Low test glue, 10% | 3 minutes. |
| Dextrose, 20% / Casein, 10% | 3 minutes. |
| Dextrose, 20% / Dextrine, 10% | 1 minute. |
| Dextrose, 20% / Gelatin, 5% | 1 minute. |
| Dextrose, 20% / Low test glue, 10% | ½ minute. |

Any dextrine might be used. In the examples white dextrines having solubles content of 20% to 30% and fluidity from 25 to 35 (one part dextrose to two parts water) was used.

Corn syrup, consisting of dextrose, dextrine and maltose, was found to have a considerable retarding effect on the hydration of anhydrous dextrose.

The results tabulated above are intended to be illustrative merely. Apparently all sugars, other than alpha dextrose, have a retarding effect, when present in solution, upon the hydration of anhydrous alpha dextrose. Also all colloids have or tend to have the same effect, but in most cases the effect is very slight except when the colloid is combined with a sugar or sugars. The quantitative effect of any retarder, or combination of retarders, can be determined, so far as we know, only empirically.

The following are specific examples of the application of the principles of this invention to the manufacture of food products using anhydrous dextrose:

EXAMPLE 1

Formula for making a cake icing compound

| | Parts |
|---|---|
| Powdered anhydrous dextrose | 100 |
| Skimmed milk powder | 20 |
| Powdered sucrose | 30 |
| Powdered corn syrup (powdered Karo) | 10 |
| Hydrogenated fat (Crisco) | 22 |
| Cocoa | 25 |

Vanillin-coumarin (15–1) to taste.
Salt to taste.

The ingredients are intimately mixed and stored in closed containers until ready for use. To prepare for use, five parts of the dry material are mixed with one part of water and beaten. The resulting mixture can be easily spread on a cake with a spatula. The above icing will remain soft for several days.

EXAMPLE 2

Formula for making a fudge compound

| | Parts |
|---|---|
| Powdered anhydrous dextrose | 300 |
| Powdered cane sugar | 50 |
| Powdered skimmed milk | 25 |
| Cocoa | 60 |
| Hydrogenated fat, melting point 92° F | 30 |
| Salt | 2 |

The ingredients are intimately mixed and stored in closed containers until ready for use. To prepare fudge from this mixture add about ⅔ of 70 parts of water or milk to 200 parts of the dry mixture. Stir to a thick paste and beat until smooth. Add the remainder of the 70 parts of liquid and continue beating the thin mixture until it has thickened sufficiently from hydrate crystallization to turn out on a slab for cutting.

In Example 1 given above the sucrose is used primarily for sweetening, but its retarding effect is nevertheless important particularly because of the presence of lactose. The powdered Karo is used primarily for texture to give a proper feel of the icing on the tongue, but the Karo also has a retarding effect on the crystallization of the dextrose. The use of hydrogenated fats in icings is common and appears to have no effect one way or the other on the crystallization of the dextrose. Any suitable flavoring substance could be substituted for the cocoa and vanilla. In fact, the formulas here given are susceptible of wide modification and are intended to be illustrative merely and not to impose any limitations on the invention.

EXAMPLE 3

Formula for making a fondant compound

| | Parts |
|---|---|
| Corn syrup 43° Bé | 50 |
| Water | 105 |
| Anhydrous dextrose (commercial size particles, not powdered) | 325 |
| Powdered dextrose hydrate | 2 |
| Invert sugar syrup (75% solids) | 90 |

The anhydrous dextrose and hydrate dextrose are mixed into a solution consisting of the 50 parts 43° Bé. corn syrup in 105 parts water and beaten until the granular character of the material is no longer noticeable. This requires about 10 minutes. Then the 90 parts of invert sugar syrup are beaten into the mix. The beating is then continued until the fondant has reached the desired consistency. This procedure produces a very fine grained fondant.

The term "hydration of solid anhydrous dextrose" is used herein to mean the transformation of the anhydrous dextrose, partially or completely, into the hydrated form with a progressive and gradual solution of the anhydrous dextrose, without the dextrose losing its essentially solid character. No claim is made herein broadly to the process of producing fondants by the hydration of anhydrous dextrose as described and claimed in co-pending application of Carl S. Miner, filed January 16, 1936, Serial No. 59,409, the invention of which was earlier in date than the herein disclosed invention; the present joint invention relating to the use in such hydration process of agents for retarding or controlling the hydration.

We claim:

1. Method of making a fondant-like compound which consists in mixing together in a dry state alpha anhydrous dextrose, a small quantity of hydrate dextrose and an agent for retarding hydration comprising sugar, other than alpha dextrose, and wetting the mixture with such an amount of water as to bring about hydration of the anhydrous dextrose while the major portion of the dextrose remains in a solid state.

2. Method of making a fondant-like compound which consists in mixing together in a dry state alpha anhydrous dextrose, a small quantity of hydrate dextrose and an agent for retarding hydration comprising sugar, other than alpha dextrose, and a water dispersible colloid, and wetting the mixture with such an amount of water as to bring about hydration of the anhydrous dextrose while the major portion of the dextrose remains in a solid state.

3. Method of making a fondant-like compound which consists in mixing together in a dry state anhydrous dextrose, a small quantity of hydrate dextrose and a hydration retarding agent comprising lactose and casein, and wetting the mixture with such an amount of water as to bring about hydration of the anhydrous dextrose while the major portion of the dextrose remains in a solid state.

4. Process of hydrating anhydrous dextrose which comprises mixing into the anhydrous dextrose a quantity of water sufficient for the hydration of the dextrose but insufficient to form a solution of all of the dextrose, together with a hydration retarding agent comprising a sugar from the class consisting of sucrose, levulose, maltose, lactose and beta dextrose.

5. Process of hydrating alpha anhydrous dextrose which comprises mixing into the anhydrous dextrose a quantity of water sufficient for the hydration of the dextrose but insufficient to form a solution of all of the dextrose, together with a hydration retarding agent comprising a sugar other than alpha dextrose.

6. Process of hydrating alpha anhydrous dextrose which comprises mixing into the anhydrous dextrose a quantity of water sufficient for the hydration of the dextrose but insufficient to form a solution of all of the dextrose, together with a hydration retarding agent comprising a plurality of sugars other than alpha dextrose.

7. Process of hydrating alpha anhydrous dextrose which comprises mixing into the dextrose a quantity of water sufficient for the hydration of the dextrose but insufficient to form a solution of all of the dextrose, together with a hydration retarding agent comprising lactose and casein.

8. Process of hydrating anhydrous dextrose which comprises mixing into the anhydrous dextrose, in the presence of a small amount of solid dextrose hydrate as a nucleating agent, a quantity of water sufficient for the hydration of dextrose but insufficient to form a solution of all of the dextrose, together with a hydration retarding agent comprising a sugar from the class consisting of sucrose, levulose, maltose, lactose and beta dextrose.

9. Process of hydrating anhydrous dextrose which comprises mixing into the anhydrous dextrose, in the presence of a small amount of solid dextrose hydrate as a nucleating agent, a quantity of water sufficient for the hydration of dextrose but insufficient to form a solution of all of the dextrose, together with a hydration retarding agent comprising lactose and casein.

10. Method of making a fondant-like compound which consists in mixing together in a dry state alpha anhydrous dextrose, a small quantity of hydrate dextrose and a hydration retarding agent comprising a plurality of sugars other than alpha dextrose, and wetting the mixture with such an amount of water as to bring about hydration of the anhydrous dextrose while the major portion of the dextrose remains in a solid state.

CARL S. MINER.
ALVA THOMPSON.